(12) United States Patent
Li (10) Patent No.: US 11,235,434 B2
(45) Date of Patent: *Feb. 1, 2022

(54) FAULT DETECTABLE SHEET BODY FIXED DISTANCE CONVEYING AND PUNCHING ASSEMBLY

(71) Applicant: DONGGUAN UNIVERSITY OF TECHNOLOGY, Dongguan (CN)

(72) Inventor: Chuan Li, Dongguan (CN)

(73) Assignee: DONGGUAN UNIVERSITY OF TECHNOLOGY, Dongguan (CN)

(*) Notice: Subject to any disclaimer, the term of this patent is extended or adjusted under 35 U.S.C. 154(b) by 64 days.

This patent is subject to a terminal disclaimer.

(21) Appl. No.: 16/417,607

(22) Filed: May 20, 2019

(65) Prior Publication Data

US 2019/0389022 A1   Dec. 26, 2019

(51) Int. Cl.
*B23Q 17/22* (2006.01)
*B23P 23/02* (2006.01)
*G01N 21/89* (2006.01)

(52) U.S. Cl.
CPC .............. *B23Q 17/22* (2013.01); *B23P 23/02* (2013.01); *G01N 21/89* (2013.01)

(58) Field of Classification Search
CPC .......... B23Q 17/22; B23P 23/02; B23P 23/04; G01N 21/89; G01S 15/88; B26F 1/02; B24B 9/06; B24B 27/0069; B24B 27/0076; B24B 41/005; B24B 41/02; B24B 41/04; B21D 28/04; Y10T 29/5105;

(Continued)

(56) References Cited

U.S. PATENT DOCUMENTS 2,062,044 A * 11/1936 Stoffel .................. B44B 5/0052
                                                                72/333
3,580,120 A *  5/1971 Adams ...................... B26F 1/02
                                                                 83/98

(Continued)

*Primary Examiner* — Jonathan G Riley
(74) *Attorney, Agent, or Firm* — Hawaii Patent Services; Nathaniel K. Fedde (57) ABSTRACT

The present invention relates to a fault detectable sheet body fixed distance conveying and punching assembly, which may include a rack, a conveying trough seat, a feeding trough, a processing rack and a punching device. On the rack is provided a feed motor and a feed screw. The movable feeding block is sleeved on the feed screw and the movable feeding seat is fixedly connected to the movable feeding seat. On the movable feeding seat is provided a feed lifting cylinder and on the feed lifting cylinder is provided a feed lifting block. On the feed lifting cylinder are equally provided feed blocks which may go through the feeding trough. On the processing rack is also provided a position detecting device which may include a detecting lifting cylinder provided on the processing rack. Under the detecting lifting cylinder is connected the detecting block. On the both sides of the detecting block is provided an acoustic wave range finder. The present invention includes a position detecting device, which may measure the position of the feeding block on the processing station by lifting the acoustic wave range finders on the position detecting device, and conduct integrity check to the fixed distance feeding part and maintain the entire assembly.

7 Claims, 5 Drawing Sheets

(58) Field of Classification Search
CPC .............. Y10T 29/5107; Y10T 29/5136; Y10T 29/5146; Y10T 29/5168; Y10T 29/517
See application file for complete search history.

(56) References Cited

U.S. PATENT DOCUMENTS

| | | | | |
|---|---|---|---|---|
| 3,673,901 | A * | 7/1972 | Vinson | B21D 43/04 |
| | | | | 83/14 |
| 5,259,100 | A * | 11/1993 | Takahashi | B21D 28/12 |
| | | | | 29/33 J |
| 2015/0027999 | A1 * | 1/2015 | Yamaguchi | B23K 37/08 |
| | | | | 219/121.44 |
| 2019/0389021 | A1 * | 12/2019 | Li | B23P 23/04 |
| 2019/0389022 | A1 * | 12/2019 | Li | G01N 21/89 |
| 2019/0389024 | A1 * | 12/2019 | Li | B23Q 17/22 |

\* cited by examiner

FAULT DETECTABLE SHEET BODY FIXED DISTANCE CONVEYING AND PUNCHING ASSEMBLY

FIELD OF THE INVENTION

The present invention relates to a working state detecting device, and especially relates to a fault detectable sheet body fixed distance conveying and punching assembly.

BACKGROUND OF THE INVENTION

As a commonly used processing material, the sheet body is widely used, especially in the use of gaskets and connecting sheets. In order to achieve a better matching installation structure, gaskets are sometimes punched.

Punching is usually done with the punching devices; however, existing punching devices punch after positioning and reclaiming materials manually, which is low in efficiency. To improve production efficiency, some automatic conveying and feeding punching devices are designed, fixed distance conveying is achieved by a fixed distance feeding device, and the sheet bodies are fed below the punching device, to complete punching process, which does improve efficiency of sheet body punching, nevertheless, there are several defects with it, especially when the punching device is used for long, machine deviation will occur and fixed distance conveyance is not as accurate as required, which affects precision of punching, in this regard, it is necessary to design a new fault detectable sheet body fixed distance conveying and punching assembly.

OVERALL OBJECTIVE OF THE INVENTION

The overall objective of the present invention is to provide a fault detectable sheet body fixed distance conveying and punching assembly, which comprises position detection device, which may measure the position of the feeding block on the punching station by the acoustic wave range finder provided on the lifting position measuring block, and perform integrity check on the fixed distance feeding part, to maintain the integrity of the assembly.

SUMMARY OF THE INVENTION

In order to achieve the above objective, the technical scheme adopted by the present invention is as follows: a fault detectable sheet body fixed distance conveying and punching assembly, including a frame and a conveying trough seat disposed on the frame; a feed trough is disposed in the middle portion of the conveying trough seat, and a processing frame is disposed on the conveying trough seat; the processing frame is sequentially provided with a punching device and a grinding device matching with the sheet body in the conveying trough seat, the frame is disposed with a feed motor and a feed screw cooperating with each other, the feed screw is sleeved with movable feed blocks, the movable feed block is connected with a movable feed seat, the movable feed seat is provided with a feed lift cylinder, the feed lift cylinder is disposed with a feed lift block; several feed blocks which can travel along the feed trough are uniformly provided on the feed lift block, and on the processing rack is provided a position detecting device, which comprises detection lifting cylinder provided on the processing rack, under the detecting lifting cylinder is connected the detecting block, and the said detecting block is located on the left side of the feeding block on the processing station, to the right of the detecting block is provided an acoustic wave range finder.

Preferably, the width of the detecting block is larger than that of the feeding trough; on the lower part of the front and rear side of the detecting block are provided the second contact sensors cooperating with the conveying trough seat; to the left side of the detecting block is provided an acoustic wave range finder; the two acoustic wave range finders are of the same height, and the distance from the acoustic wave range finder to the bottom of the detecting block is less than the thickness of sheet bodies.

Preferably, the feed block is an L-shaped block, and the length of horizontal portion thereof is consistent with the length of the sheet body; the feed blocks located at the punching station and the grinding station are provided with a discharging opening matching with the punching and grinding portion of the sheet body; the feed lift block is provided with a collect port which is connected with the discharging opening; on the movable feeding seat is provided a collection assembly cooperating with the collect port.

Preferably, the detecting block is a right angle block and its horizontal part is located on the upper right side of its vertical part, and the horizontal part of the detecting block is flush with the right side of the vertical part of feed blocks; to the lower right end of horizontal part of the detecting block are provided two first contact sensors and the two first contact sensors respectively cooperate with the right and left side of the feed blocks by contact.

Preferably, the punching device may include a punching cylinder provided on the processing rack; the lower end of the punching cylinder is connected to the punching pressing block fitting the sheet body on the conveying trough seat; the punching mounting slot is provided on the lower part of the punching pressing block upward, and the punching mounting slot shares the same axis with the discharging opening provided on the feed blocks on the processing station; in the punching mounting slot is provided a punching head fitting the sheet body.

Preferably, the punching head may include a punching lifting cylinder provided in the punching mounting slot vertically; a rotary punching motor is connected to the lower part of the punching lifting cylinder; the lower end of the rotary punching motor is connected to a punching bit and the lower part of the punching bit is annular cutter.

Preferably, the collecting device includes a collecting frame provided on the movable feeding seat; to the outside of the collecting frame is sleeved a material blocking frame which may move upward and downward; the left and right side boards of the material blocking frame are vertical plates; the front and rear side boards of the material blocking frame are vertical plates and the upper board of the material blocking frame is a slanting plate which tilts outward and upward; on the movable feeding seat are provided collecting frame fixing blocks matching the material blocking frame by gripping bolts; when the collecting frame fixing blocks hold the collecting frame in position, the material blocking frame is provided on the upper side of the collecting frame fixing block; the left and right side boards of the material blocking frame are higher than the front and rear side boards, and on the feed lifting block are provided positioning slots cooperating with the left and right side boards of the material blocking frame.

REFERENCE NUMBER KEY

All of the various components of the invention are denoted by the following reference characters:
1. rack,
2. Conveying trough seat,
3. feeding trough,
4. sheet body,
5. feed motor,
6. feed screw,
7. movable feeding block,
8. movable feeding seat,
9. feed lifting cylinder,
10. feed lifting block,
11. feed block,
12. processing rack,
13. punching device,
14. position detecting device,
15. collecting device,
21. detecting lifting cylinder,
22. detecting block,
23. the first contact sensor,
24. acoustic wave range finder,
25. the second contact sensor,
26. punching cylinder,
27. punching head,
28. discharging opening,
29. collection opening,
31. punching pressing block,
32. punching mounting slot,
33. punching lifting cylinder,
34. rotary punching motor,
35. punching bit,
37. collecting frame,
38. material blocking frame,
39. collecting frame fixing block,
40. gripping bolt,
41. positioning slot.

DETAILED DESCRIPTION OF THE ILLUSTRATED EMBODIMENT

In order to enable a person skilled in the art to better understand the technical scheme of the present invention, the following description may be given to the present invention in detail with reference to the accompanying drawings. The description of the invention is merely exemplary and explanatory and should not limit the scope of the protection scope of the present invention.

As is shown in FIGS. 1 to 4, the present invention is shown as follows: the present invention relates to a fault detectable sheet body fixed distance conveying and punching assembly, including a frame 1 and a conveying trough seat 2 disposed on the frame 1; a feed trough 3 is disposed in the middle portion of the conveying trough seat 2, and a processing frame 12 is disposed on the conveying trough seat 2; the processing frame 12 is sequentially provided with a punching device 13 and a grinding device 16 matching with the sheet body 4 in the conveying trough seat 2, the frame 1 is disposed with a feed motor 5 and a feed screw 6 cooperating with each other, the feed screw 6 is sleeved with movable feed blocks 7, the movable feed block 7 is connected with a movable feed seat 8, the movable feed seat 8 is provided with a feed lift cylinder 9, the feed lift cylinder 9 is disposed with a feed lift block 10; several feed blocks 11 which can travel along the feed trough 3 are uniformly provided on the feed lift block 10, and on the processing rack 12 is provided a position detecting device 14, which comprises detection lifting cylinder 21 provided on the processing rack 12, under the detecting lifting cylinder 21 is connected the detecting block 22, and the said detecting block is located on the left side of the feeding block 11 on the processing station, to the right of the detecting block 22 is provided an acoustic wave range finder 24. The position detecting device may measure the position of the feeding block on the processing station by lifting the acoustic wave range finders on the position detecting device, and conduct integrity check to the fixed distance feeding part and maintain the entire assembly.

Figure 3:
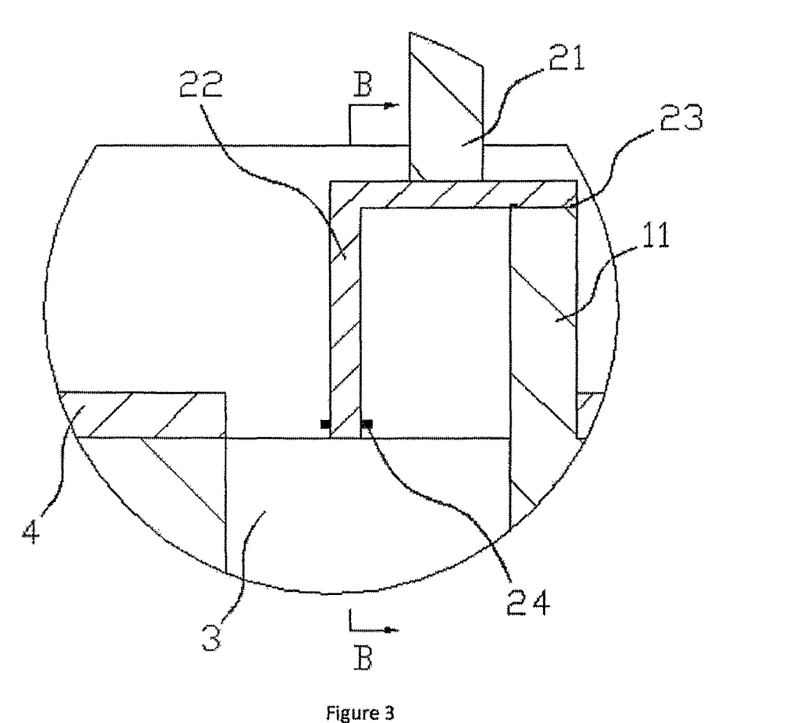
FIG. 3 shows the schematic view of the enlarged view of part A in FIG. 2.
Figure 4:
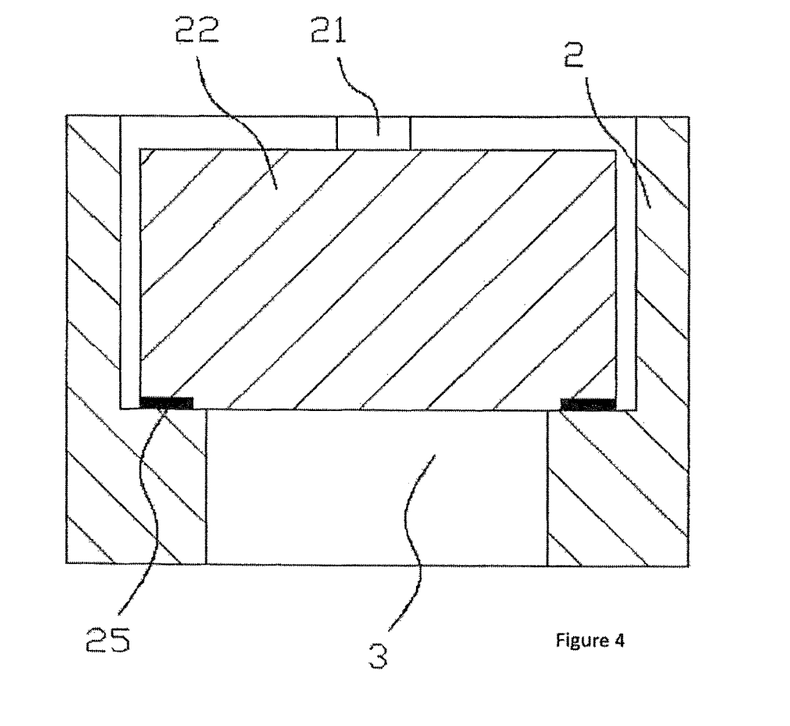
FIG. 4 shows the sectional structure view of B-B in FIG. 3.

As is shown in FIGS. 3 and 4, the width of the detecting block 22 is larger than that of the feeding trough 3; on the lower part of the front and rear side of the detecting block 22 are provided the second contact sensors 25 cooperating with the conveying trough seat 2; to the left side of the detecting block 22 is provided an acoustic wave range finder 24; the two acoustic wave range finders 24 are of the same height, and the distance from the acoustic wave range finder 24 to the bottom of the detecting block 22 is less than the thickness of sheet bodies 4. By designing two acoustic wave range finders, it is possible to measure accurately position of the feeding block on the processing station and that of the previous sheet body on the processing station, to ensure the accuracy of feeding.

Figure 1:
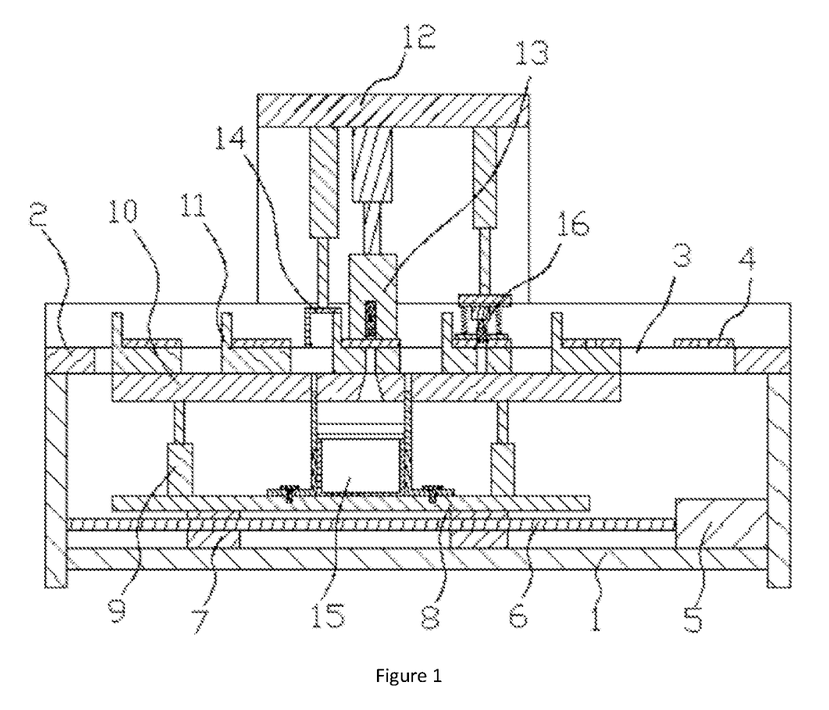
FIG. 1 shows the perspective view of the fault detectable sheet body fixed distance conveying and punching assembly.
Figure 2:
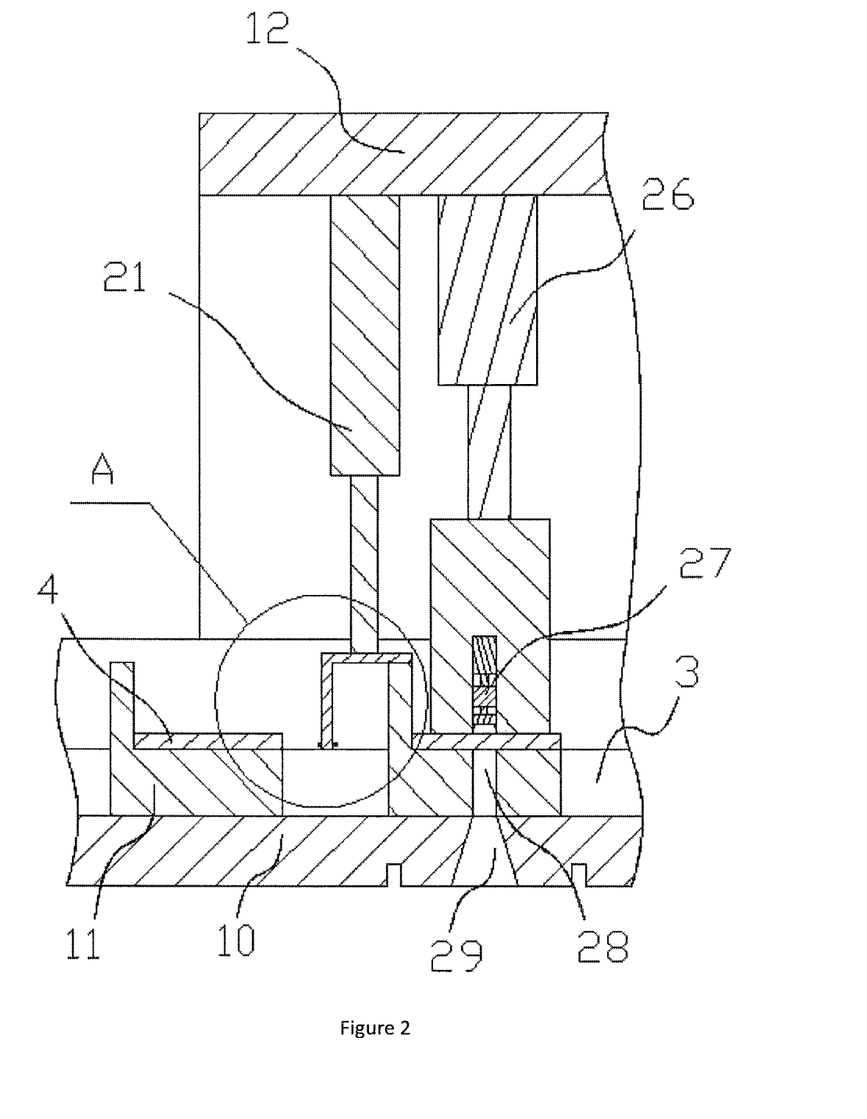
FIG. 2 shows the schematic view of the position detecting device and the punching device.

As is shown in FIG. 2, the feed block 11 is an L-shaped block, and the length of horizontal portion thereof is consistent with the length of the sheet body; the feed blocks 11 located at the punching station and the grinding station are provided with a discharging opening 28 matching with the punching and grinding portion of the sheet body; the feed lift block 10 is provided with a collect port 29 which is connected with the discharging opening 28; on the movable feeding seat 8 is provided a collection assembly 15 cooperating with the collect port 29. By designing the feeding block, it is possible to support the sheet body, and improve sheet body punching effect; furthermore, with the discharging opening working in cooperation with the collecting device, punched rejects may be collected to avoid any interference with the feeding part.

As is shown in FIG. 3, the detecting block 22 is a right angle block and its horizontal part is located on the upper right side of its vertical part, and the horizontal part of the detecting block 22 is flush with the right side of the vertical part of feed blocks 11; to the lower right end of horizontal part of the detecting block 22 are provided two first contact sensors 23 and the two first contact sensors 23 respectively cooperate with the right and left side of the feed blocks 11 by contact. By the structural design of the position detecting block, it is possible to know whether the height of the feeding blocks is accurate with the first contact sensors and the second contact sensors. If the feed block is too high, adjustment is required to avoid that the sheet body is pressed down to deformation during punching and if the feeding block is too low, good support to the sheet body during punching cannot be achieved. Furthermore, by utilizing two first contact sensors, it is possible to know whether thickness of the vertical parts of the feeding blocks is qualified.

Figure 5:
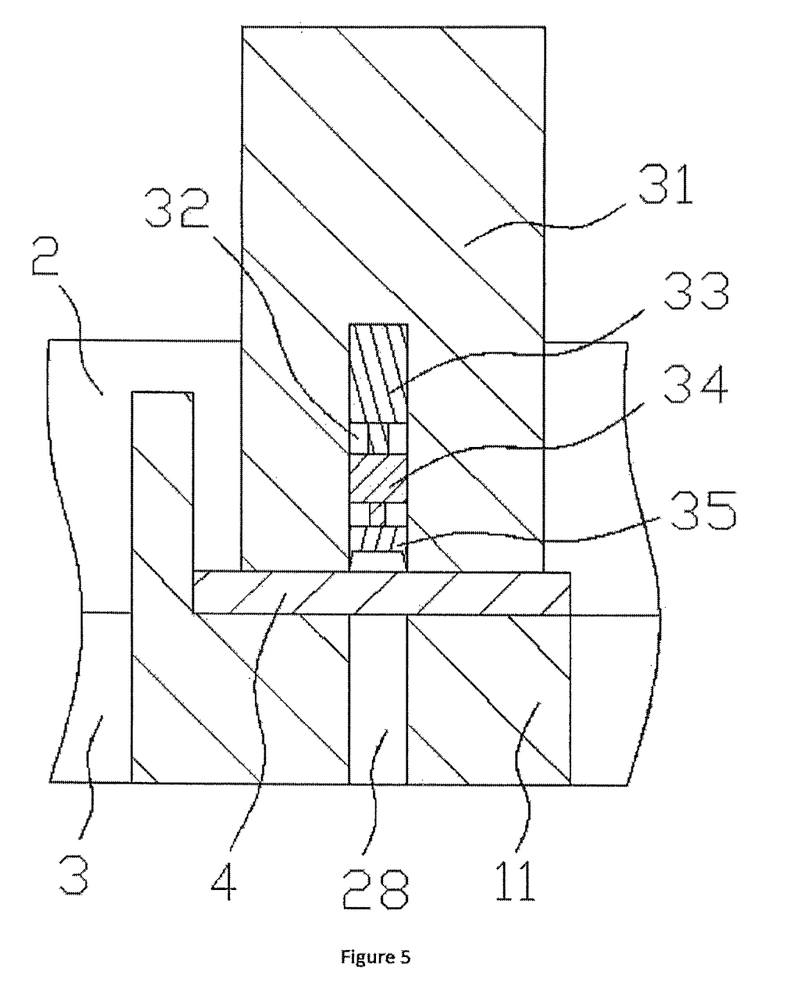
FIG. 5 shows the schematic view of the punching part.

As is shown in FIGS. 2 and 5, the punching device may include a punching cylinder 26 provided on the processing rack 12; the lower end of the punching cylinder 26 is connected to the punching pressing block 31 fitting the sheet body 4 on the conveying trough seat 2; the punching mounting slot 32 is provided on the lower part of the punching pressing block 31 upward, and the punching mounting slot 32 shares the same axis with the discharging opening 28 provided on the feed blocks 11 on the processing station; in the punching mounting slot 32 is provided a punching head 27 fitting the sheet body 4. The punching pressing block can press and hold the sheet body in position, and promise that no shaking will occur during punching.

As is shown in FIG. 5, the punching head 27 may include a punching lifting cylinder 33 provided in the punching mounting slot 32 vertically; a rotary punching motor 34 is connected to the lower part of the punching lifting cylinder 33; the lower end of the rotary punching motor 34 is connected to a punching bit 35 and the lower part of the punching bit 35 is annular cutter. By the annular cutter cooperating with the rotary punching motor, a rotary cutting can be achieved to ensure good performance of punching.

Figure 6:
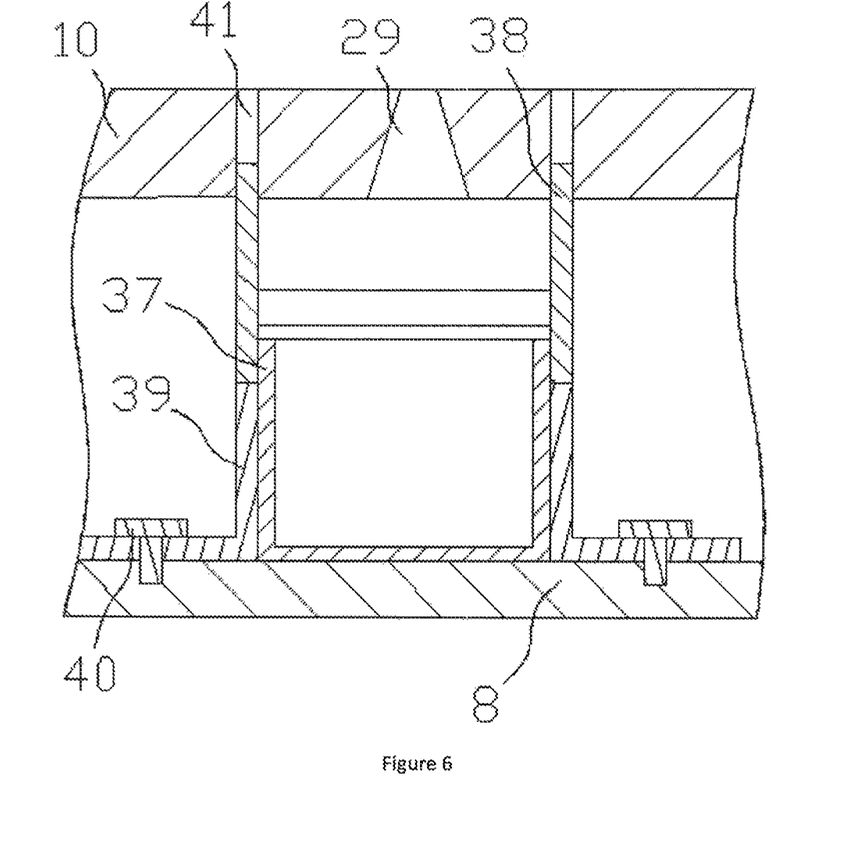
FIG. 6 shows the schematic view of the collecting device.

As is shown in FIG. 6, the collecting device 15 includes a collecting frame 37 provided on the movable feeding seat 8; to the outside of the collecting frame 37 is sleeved a material blocking frame 38 which may move upward and downward; the left and right side boards of the material blocking frame 38 are vertical plates; the front and rear side boards of the material blocking frame 38 are vertical plates and the upper board of the material blocking frame 38 is a slanting plate which tilts outward and upward; on the movable feeding seat 8 are provided collecting frame fixing blocks 39 matching the material blocking frame 38 by gripping bolts 40; when the collecting frame fixing blocks 39 hold the collecting frame 37 in position, the material blocking frame 38 is provided on the upper side of the collecting frame fixing block 39; the left and right side boards of the material blocking frame 38 are higher than the front and rear side boards, and on the feed lifting block 10 are provided positioning slots 41 cooperating with the left and right side boards of the material blocking frame 38. With the delicate design of material blocking frame together with the collecting frame fixing blocks, good material stopping effect can be achieved, in the meantime, the left and right side boards of the material blocking frame can be plugged into the feeding lifting block, so during feeding, the collecting frame can be fed together, and the material blocking frame can act to synchronize movement of the feeding block and the movable feeding seat to facilitate accurate horizontal movement of the feed lifting block.

The operation of the assembly is as follows:

Debug the device first, then put the iron sheet into the left part of the feeding slot 3 on the feeding slot seat 2; rotate the feeding screw 6 by the feeding motor 5, thereby drive the movable feeding seat 8 to move to the left, thereby the feeding block 11 is moved to the left of the sheet body 5; the feeding lift cylinder 9 drives the feeding lift block 10 to move up, thereby the feed block 11 is raised and vertical portion thereof passing through the feeding slot 3; the feed motor 5 is rotated reversely to drive the feed screw 6 to rotate reversely, thereby drive the feeding block 11 to move to the right; during that, the sheet body 4 is touched and is driven to move to the right by a certain distance to complete a fixed distance movement. Subsequently, the sheet body is repeatedly placed and moved for a fixed distance, the first sheet body will be fed to the punching station by the feeding block 11 matching the punching station during the process of feeding for a fixed distance; the punching cylinder 26 may drive the punching pressing block 31 to press and hold the sheet body in position, drive the punching bit 35 to rotate with the rotary punching motor 34 and drive the punching bit 35 downwards with the punching lifting cylinder 33, furthermore the annular cutter under the punching bit 35 may cut the sheet body 4, and stop rotation. The punching lifting cylinder 33 may drive the punching bit 35 to press down and finish the punching process. The punched reject may be collected from the discharging opening 28 to the collecting frame 37 through the collection opening 29.

The above process may repeat on the following sheet bodies. The punched product may be driven by the subsequent feed block to the right side of the feeding trough 3, and taken away. In the whole punching process, the detecting lifting cylinder 21 may drive the detecting block 22 down at appropriate intervals. Whether the feeding height of the feed blocks 11 is proper can be detected by checking whether the first contact sensors and the second contact sensors generate inductive signals. If the first contact sensors 23 generate a signal but the second contact sensors don't, the feed blocks may be too high, and the total assembly needs commissioning. If the first contact sensors 23 do not generate the signal and the second contact sensors do, the feed block may be too low, and the total assembly needs commissioning. If both the first contact sensors and the second contact sensors generate signals, the feed blocks are in the appropriate height. Then measure the distance with the acoustic wave range finders. If the results obtained by the right acoustic wave range finder agree with the theoretical value, feeding position of the feeding block 11 on the processing station is accurate and otherwise, inaccurate. If the results obtained by the left acoustic wave range finder agree with the theoretical value, the feeding of the previous processing station is accurate. If not, the feeding of the previous processing station is not accurate or the size of the sheet body is not correct, reviewing and commissioning is necessary. In this way, the above operation can be monitored and maintained in real time. And when the reject material in the collecting frame 37 reaches a certain amount, the collecting frame fixing block 39 may be disconnected by removing the gripping bolts 40, and the material blocking frame 38 will fall off. Then the collecting frame 37 and material blocking frame 38 may be removed to finish cleaning.

What is claimed is:

1. A fault detectable sheet body fixed distance conveying and punching assembly, comprising:
    a frame and a conveying trough seat disposed upon said frame;
    a feed trough disposed at a middle portion of said conveying trough seat; and
    a processing rack disposed upon said conveying trough seat;
    wherein said processing rack is sequentially provided with a punching device comprising a punching head located at a punching station and a grinding device comprising a grinding head located at a grinding station, said punching device and said grinding device matching with a sheet body for punching and grinding a sheet body which is disposed at said punching and grinding stations;
    wherein said frame has a feed motor mounted thereon for driving a feed screw, said feed screw is sleeved within at least one movable feed block such that when said feed motor drives said feed screw, said at least one movable feed block moves along said frame;

wherein said at least one movable feed block has a movable feed seat mounted upon said at least one movable feed block so as to be movable with said at least one movable feed block as said at least one movable feed block moves along said frame, said movable feed seat is provided with at least one feed lift cylinder, and said at least one feed lift cylinder is connected to a feed lift block;

a plurality of feed blocks are movably mounted upon said feed lift block so as to be movable within said feed trough;

a position detecting device comprises a detecting lifting cylinder mounted upon said processing rack, a detecting block is fixedly mounted upon a lower end portion of said detecting lifting cylinder and is located on one side of said plurality of feed blocks; and at least one acoustic wave range finder mounted upon said detecting block so as to accurately determine the location of any one of said plurality of feed blocks disposed upon said feed lift block.

2. The fault detectable sheet body fixed distance conveying and punching assembly of claim 1, wherein:

a width dimension of said detecting block is greater than a width dimension of said feed trough;

a first pair of contact sensors are disposed upon lower end portions of said detecting block for operatively cooperating with said conveying trough seat; and said at least one acoustic wave range finder comprises a pair of acoustic wave range finders which are disposed upon opposite sides of said detecting block and are disposed at the same elevation upon said detecting block wherein a distance dimension defined between said pair of acoustic wave range finders and a bottom portion of said detecting block is less than a thickness dimension of said sheet body to be punched.

3. The fault detectable sheet body fixed distance conveying and punching assembly of claim 2, wherein:

each one of said plurality of feed blocks movably mounted upon said feed lift block has an L-shaped configuration wherein a length dimension of a horizontal portion of each one of said plurality of feed blocks movably mounted upon said feed lift block is consistent with a length dimension of said sheet body;

wherein one of said plurality of feed blocks located at said punching station and movably mounted upon said feed lift block is provided with a discharge opening which is adapted to be aligned with a portion of said sheet body to be punched at said punching station;

a collection port is defined within said feed lift block and is connected with said discharge opening defined within said one of said plurality of feed blocks movably mounted upon said feed lift block; and a collection assembly is fixedly mounted upon said movable feed seat and is in communication with said collection port.

4. The fault detectable sheet body fixed distance conveying and punching assembly of claim 3, wherein:

said detecting block comprises a right-angled block wherein a horizontal portion of said detecting block is disposed in contact with an upper end of a vertical portion of one of said plurality of feed blocks movably mounted upon said feed lift block; and a second pair of contact sensors are interposed between said detecting block and one of said plurality of L-shaped feed blocks movably mounted upon said feed lift block at the location wherein said horizontal portion of said detecting block is disposed in contact with said upper end of said vertical portion of said one of said plurality of L-shaped feed blocks movably mounted upon said feed lift block.

5. The fault detectable sheet body fixed distance conveying and punching assembly of claim 3, wherein:

said punching device comprises a punching cylinder mounted upon said processing rack, wherein a lower end portion of said punching cylinder is connected to a punching pressing block which is adapted to retain said sheet body upon said one of said plurality of feed blocks disposed at said punching station;

a punching mounting slot is defined within a lower end portion of said punching pressing block and is coaxial with said discharge opening defined within said one of said plurality of feed blocks disposed at said punching station; and a punching head is disposed within said punching mounting slot of said punching pressing block for punching said sheet body disposed upon said one of said plurality of feed blocks disposed at said punching station.

6. The fault detectable sheet body fixed distance conveying and punching assembly of claim 5, wherein:

said punching head comprises a punching lifting cylinder disposed within said punching mounting slot;

a rotary punching motor is operatively connected to a lower end portion of said punching lifting cylinder;

a lower end portion of said rotary punching motor (34) is operatively connected to a punching bit; and a lower end portion of said punching bit comprises an annular cutter.

7. The fault detectable sheet body fixed distance conveying and punching assembly of claim 3, wherein:

said collection assembly comprises a collecting frame disposed upon said movable feed seat;

a material blocking frame annularly surrounds an upper portion of said collecting frame and is adapted to move upwardly and downwardly;

a first pair of side boards of said material blocking frame comprise vertical plates, as do a second pair of side boards of said material blocking frame, and an upper board of said material blocking frame comprises a slanted plate which is angled outwardly and upwardly;

a pair of collecting frame fixing blocks are fixedly mounted upon said movable feed seat so as to retain said collecting frame upon said movable feed seat;

wherein said material blocking frame is disposed atop said collecting frame fixing block and extends vertically upwardly therefrom, said first pair of side boards of said material blocking frame extending higher than said second pair of side boards; and a pair of positioning slots are defined within said feed lift block for accommodating said first pair of side boards of said material blocking frame.

* * * * *